United States Patent [19]
Gou et al.

[11] Patent Number: 5,577,085
[45] Date of Patent: Nov. 19, 1996

[54] BOILING WATER REACTOR WITH COMPACT CONTAINMENT AND SIMPLIFIED SAFETY SYSTEMS

[75] Inventors: Perng-Fei Gou; Larry E. Fennern; Charles W. Dillmann; Craig D. Sawyer; Momtaz M. Aburomia; Charles W. Relf; Mark W. Siewert; John C. Walther, all of San Jose, Calif.

[73] Assignee: General Electric Company, San Jose, Calif.

[21] Appl. No.: 428,810

[22] Filed: Apr. 24, 1995

[51] Int. Cl.$^6$ ................................................ G21C 9/00
[52] U.S. Cl. .................... 376/293; 376/296; 376/292; 376/206
[58] Field of Search ..................... 376/293, 296, 376/292, 247, 249, 206; 976/196, 166

[56] References Cited

U.S. PATENT DOCUMENTS

| | | | |
|---|---|---|---|
| 3,712,012 | 1/1973 | Meyer et al. | 52/249 |
| 3,713,968 | 1/1973 | Kennedy et al. | 376/293 |
| 3,733,760 | 5/1973 | Koerner | 52/224 |
| 3,818,935 | 6/1974 | Karker et al. | 376/293 |
| 3,844,884 | 10/1974 | Frank et al. | 376/230 |
| 3,956,063 | 5/1976 | Johnson et al. | 376/282 |
| 3,979,866 | 9/1976 | Prescott | 52/249 |
| 4,154,650 | 5/1979 | Prescott et al. | 376/289 |
| 4,382,907 | 5/1983 | Robin | 376/283 |
| 4,643,871 | 2/1987 | Fajeau | 376/282 |
| 4,980,117 | 12/1990 | Blavshild | 376/205 |
| 5,169,595 | 12/1992 | Cooke | 376/282 |
| 5,204,054 | 4/1993 | Townsend et al. | 376/296 |

*Primary Examiner*—Charles T. Jordan
*Assistant Examiner*—Meena Chelliah
*Attorney, Agent, or Firm*—James E. McGinness

[57] ABSTRACT

A nuclear reactor having a pressure vessel which is open at the top. The open top of the pressure vessel is closed by a steel dome. A containment, which is open at the top, extends upward from and is joined to the top of the pressure vessel and has an open containment head at the top thereof. The open top of the containment is closed by a steel dome, thereby forming a containment well bounded laterally by the containment, on the bottom by the vessel closure and on the top by the containment closure. The pressure vessel can be a steel-lined prestressed concrete vessel, while the containment is formed by an extension of the prestressed concrete vessel. Alternatively, the pressure vessel and the containment are parts of a unitary steel vessel. Isolation valves are installed on each penetration pipeline to isolate the system in the event of a loss-of-coolant accident. An isolation valve located external to the pressure vessel and the portion of the pipeline between that external isolation valve and the interior of the pressure vessel are encased in guard piping. The space between the pipeline and the guard piping is pressurized and monitored to detect any leak in either the pipeline or the guard piping.

16 Claims, 9 Drawing Sheets

BOILING WATER REACTOR WITH COMPACT CONTAINMENT AND SIMPLIFIED SAFETY SYSTEMS

FIELD OF THE INVENTION

This invention relates to systems for isolating the reactor pressure vessel of a nuclear reactor in the event of a loss-of-coolant accident.

BACKGROUND OF THE INVENTION

The evolution of nuclear reactor systems of the water reactor type has led to the development of such systems in the 200 C MWe plus range and to utilization of stainless steel reactor pressure vessels wherein operating pressure is about 1000 psi. These reactor vessels have reached an internal diameter of about 13 m. Manufacture of vessels of this size involves special fabrication requirements not easily met, especially since fabricators capable of fulfilling such a manufacturing task are few. Also with a practical steel vessel diameter limitation of about 13 m, finding available surface space on a vessel to effect penetration of the many devices and appurtenant components which must be fixed on the vessel, including control rods, piping, instrumentation and cooling lines, is a problem. Because of the many penetrations in the head and wall of the pressure vessel, the latter must be placed within a containment structure for isolating leaked fluids from the reactor environs. The result is an undesirably complex reactor pressure vessel structure and less than optimal system capacity.

To address this problem, a prestressed concrete reactor pressure vessel comprising a steel inner liner, an intermediate insulative layer (e.g., concrete) and an outer prestressed concrete encasement was proposed in U.S. Pat. No. 5,204,054. In accordance with the design disclosed in that patent, a prestressed concrete cover sits on top of the prestressed concrete outer vessel. The steel inner liner passes up through a central opening in the cover and itself is closed by a convex dished head made of steel. Cooling passages are formed at the interface of the outer vessel part with the insulative layer and at the interface of the steel inner liner with the insulative layer.

The use of a prestressed concrete reactor pressure vessel allows for a very large fuel core, simplifies the approach to plant safety and provides a mild response to a plant transient. The use of prestressed concrete construction removes the current size limitations imposed by the steel reactor vessels due to the steel fabrication capacity. This enables the design of a super large-sized natural circulation reactor having a low-power-density core and high plant output power.

SUMMARY OF THE INVENTION

The present invention is a reactor pressure vessel and associated isolation system suitable for use in both natural and forced circulation reactors. To reduce reactor building and containment costs, the reactor is designed so that the only safety response needed for any loss-of-coolant accident (LOCA) event is reactor isolation. By designing a highly reliable isolation system which can stabilize the reactor pressure and maintain water inventory, the suppression pool and conventional containment can be replaced by the isolation system. The isolation system effectively eliminates the possibility of LOCA or severe accident from occurring.

The preferred embodiment of the invention is a steel-lined prestressed concrete reactor vessel (PCRV) which houses the reactor internal components, fuel and coolant. The pressure retention capability of the PCRV is provided by prestressing tendons extending in both the hoop direction and the meridional direction, with galleries providing access to perform inspection and to prestress tendons. The most distinguishing feature of a PCRV is the degree of redundancy that exists in structure. A leak-before-break is the only possible failure mode for a steel-lined reinforced concrete pressure-bearing structure under pressurization.

The present invention further incorporates the concept of a high-pressure containment head closure to provide a redundancy in addition to a conventional steel reactor vessel head closure. In accordance with one preferred embodiment, the containment head closure comprises a steel closure attached to the PCRV such that a well is formed between the vessel head and containment head closures. In the event of a leak in the vessel head closure, the containment head closure will contain the pressurized fluid which enters the well.

A reactor with a PCRV can serve as its own containment since catastrophic failure of the PCRV is precluded by the compression in the PCRV wall and the redundancy in the tendons providing that compression. Isolation valves are used to isolate the reactor vessel in the event of a LOCA. Vessel isolation during a LOCA is provided through a system of dual main steam isolation valves (MSIVs), dual feedwater isolation valves (FWIVs), dual feedwater check valves (FWCVs) and suitable dual isolation valves on any other hydraulic penetrations which may be necessary. Because the vessel isolation can be easily integrated into the PCRV design, a traditional large containment is not required.

In accordance with a further aspect of the invention, penetration lines and piping, representing pressure vessel nozzles, are surrounded by guard piping, and the guard piping is extended to cover at least the first (in-board) isolation valve. The guard piping is placed around piping through penetrations as a second barrier and defense against primary pressure system boundary pipe break. The space between the primary system pressure boundary pipe and guard piping is pressurized to an intermediate pressure and monitored during operation.

Thus, the invention eliminates the need for a primary containment vessel around the PCRV except for the head containment. Since the isolation system is designed following principles of redundancy and independence of the associated components, a LOCA which is not isolated cannot occur as a design basis event assuming single failure of a component. If there should be any break in piping connected to the reactor pressure boundary, loss of reactor vessel inventory will be rapidly terminated by actuation of the isolation valves.

If the entire reactor needs to be isolated as a result of a pipe break, isolation condensers will remove the long-term decay heat and maintain vessel inventory. The isolation condenser system limits reactor pressure and temperature within an acceptable range so that safety/relief valve operation is not required for anticipated transients. In addition, when the reactor becomes isolated during power operation, the isolation condenser system maintains reactor water level and therefore automatic depressurization will not occur.

Thus, in accordance with the present invention, the PCRV serves as its own containment, and the response to a large pipe break, such as a main steam line break, is isolation of the reactor with subsequent control of pressure and inventory by isolation condensers. Other emergency core cooling systems are not needed since loss of coolant is quickly terminated and there will be no substantial loss of inventory from the PCRV.

In order to limit the concrete temperature to 150° F., a cooling system is provided comprising cooling pipes embedded in the concrete or attached to the steel liner. Alternatively, a reactor wall cooling jacket can be installed between the steel liner and core shroud. By combining the cooling system with an insulation layer of zirconium sand or fused silica blocks, the demands on the cooling system will be greatly reduced and system redundancy is provided.

DETAILED DESCRIPTION OF THE PREFERRED EMBODIMENTS

Figure 1:
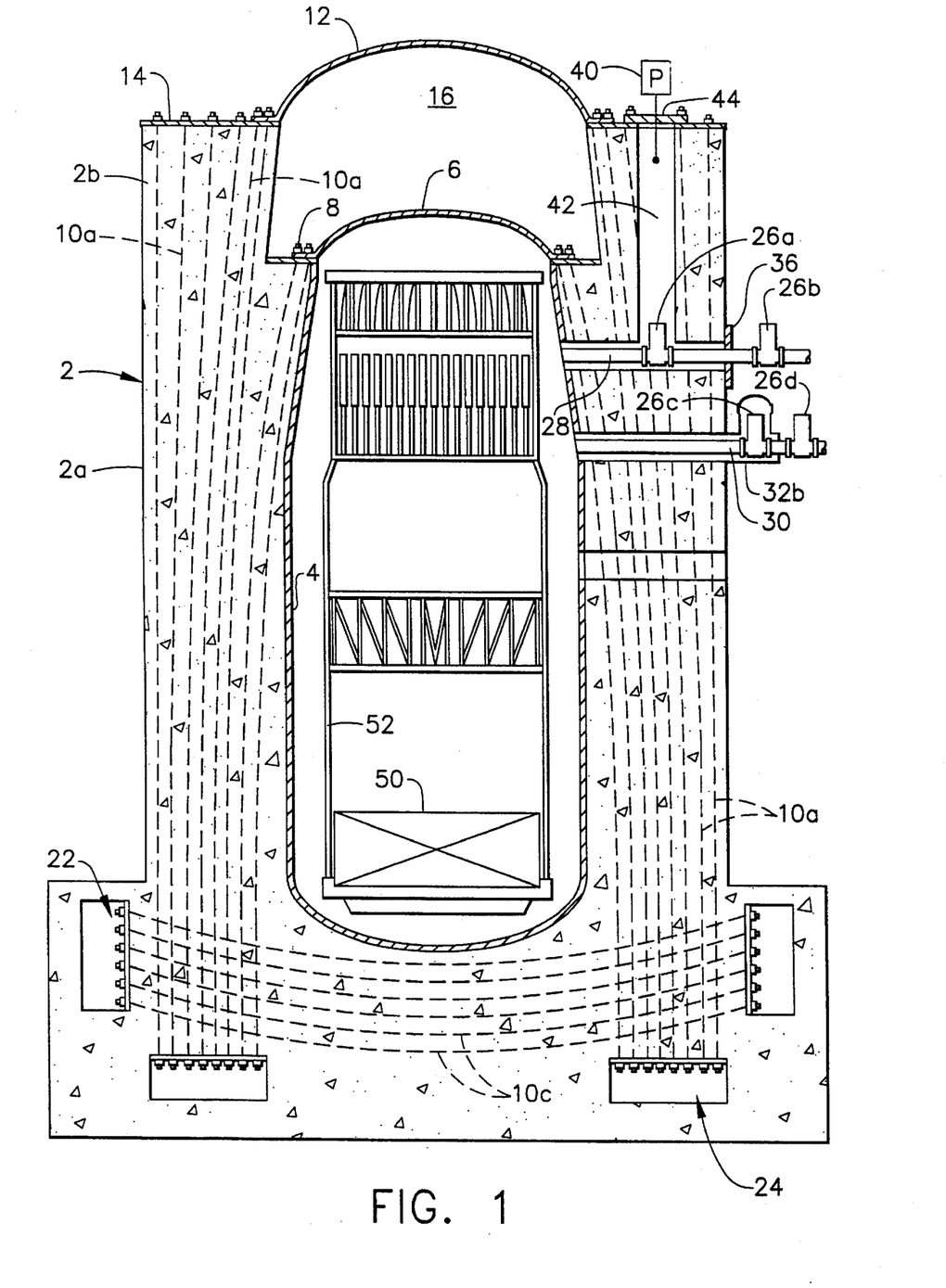
FIG. 1 is a schematic diagram showing a natural circulation reactor having a steel-lined prestressed concrete reactor pressure vessel, double steel head closures, and a main steam line which penetrates the inner steel liner in accordance with a preferred embodiment of the invention.

FIG. 1 illustrates the basic prestressed concrete reactor pressure vessel concept which has complete prestressed concrete construction including the penetration regions. The natural circulation reactor shown in FIG. 1 has a prestressed concrete reactor vessel (PCRV) 2 comprising a pressure vessel portion 2a, which is lined on its internal surface with a steel liner 4, and a containment portion 2b, which extends upward from the top of the pressure vessel portion 2b. The fuel core 50 is supported inside the fuel core shroud 52, which is in turn supported in an upright position by the PCRV. The top of the pressure vessel portion 2a is closed by a steel dome 6 which has an annular flange held down by tensioned nuts 8 coupled to the ends of respective vertical tendons 10a (indicated by dashed lines) which pass through pipes (not shown) embedded in the concrete. Similarly, the top of the containment portion 2b is closed by a steel dome 12 which has an annular flange held down in a manner similar to that described for dome 6. The concept shown in FIG. 1 uses a steel head in order to meet the present crane capacity, to use the present established refueling and servicing procedures, and to avoid cooling of the head. The steel domes 6 and 12 and containment 2b form a well 16 for containing gases which may escape from the pressure vessel in the event that dome 6 is breached. In accordance with the concept of the present invention, the steel dome 6 is designed to fail before the steel-lined PCRV 2 fails.

The most distinguishing feature of a prestressed concrete reactor pressure vessel is the degree of redundancy that exists in structure. The structural redundancy in a PCRV is rooted in the fact that a large number of prestressing tendons are required to break at exactly the same instant, making a catastrophic failure virtually impossible. This is due to the following: (a) the tendon stresses during normal conditions are at various levels (with an acceptable range) relative to their ultimate strength and, therefore, would not reach their ultimate capacities simultaneously; (b) failure of the prestressing system is designed to be the highest failing mode in a series of well-separated preceding failure modes; (c) unlike crack propagation in a steel vessel, progressive failure of the tendons, if it were to occur, would proceed in discrete steps which would be terminated by the lowest failure mode, namely leakage through the head of the PCRV; (d) although it may be statistically possible for a single tendon, or even several tendons, to fail during normal operations due to strand breakage or anchor slippage, the reserve capacities of the neighboring tendons will, by design, take over the load shed by the broken tendons; and (e) the reserve capacities that are available, by design, in the prestressing tendons have made tendon replacement during operations routine.

Taking advantage of this behavior and the redundancy in tendons, the PCRV can serve as a containment itself. Thus, it is desirable to extend the prestressed concrete construction to include the reactor head as shown in FIG. 1. A steel annular plate 14 is anchored at the PCRV wall top surface to provide anchorage for tendons 10a and to transfer loads from the vessel head to the PCRV wall. The vessel is lined with a steel liner 4 on the inside surface to maintain leaktightness.

Figure 2:
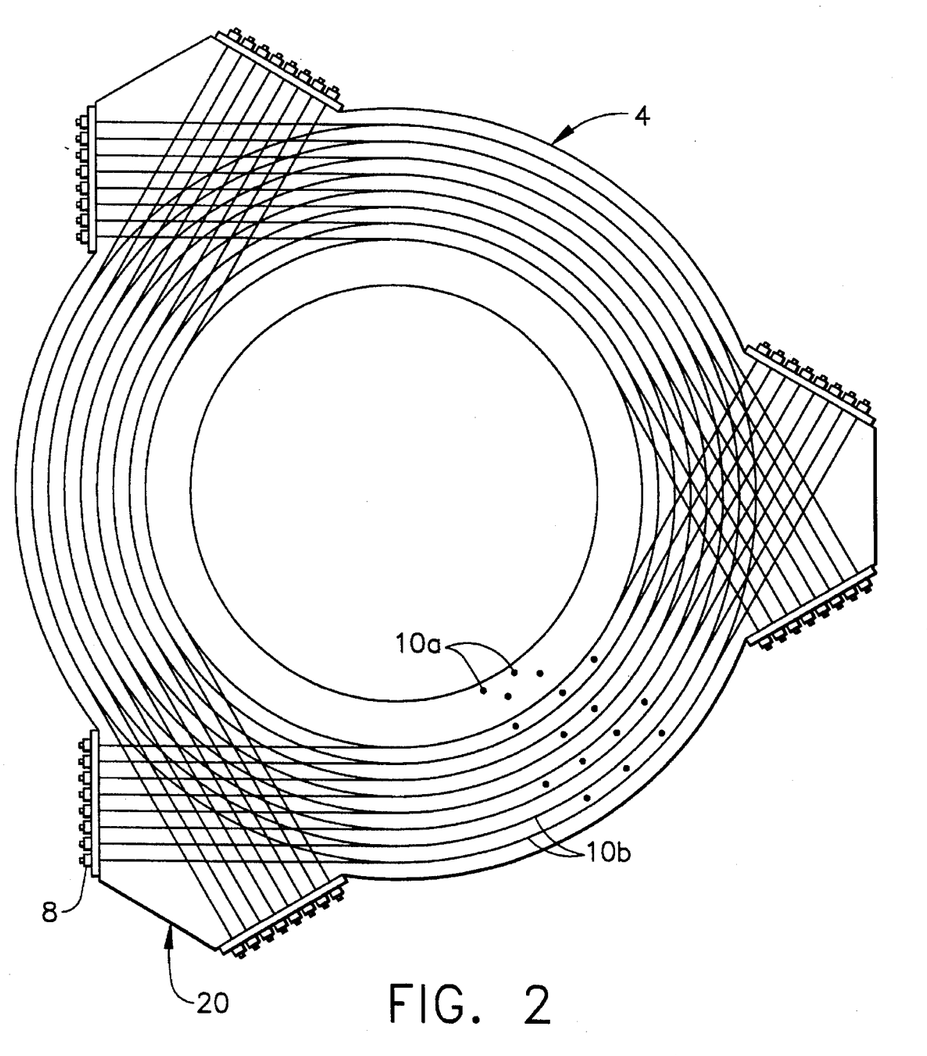
FIG. 2 is a schematic diagram showing a typical hoop tendon arrangement for a prestressed concrete reactor pressure vessel having three buttresses spaced at equal angles.

The pressure retention capability of the PCRV 2 is provided by the hoop prestress that is produced by the hoop tendons 10b anchored at buttresses 20, as shown in FIG. 2, and the meridional prestress that is produced by the longitudinal tendons 10a anchored at the top and bottom of the PCRV wall, as shown in FIG. 1. A circular gallery 24 is placed at the bottom of the PCRV for the lower anchors The prestress in the lower head is provided by a number of layers of tendons 10c that are anchored to the inside wall of the lower head tendon gallery 22. The PCRV can have three or more buttresses. The shape of the gallery is hexagonal if there are three buttresses; it is octagonal if there are four buttresses. The penetrations for the main steam lines, feedwater lines and emergency core cooling lines are placed in the upper portion of the PCRV. The tendons are routed around the large penetration openings in the PCRV wall, such as the one for the main steam line.

Catastrophic failure of the PCRV is precluded because of the compression in the PCRV wall, which is in contrast to the state of tensile stress in a steel vessel subjected to internal pressure loads.

Figure 3:
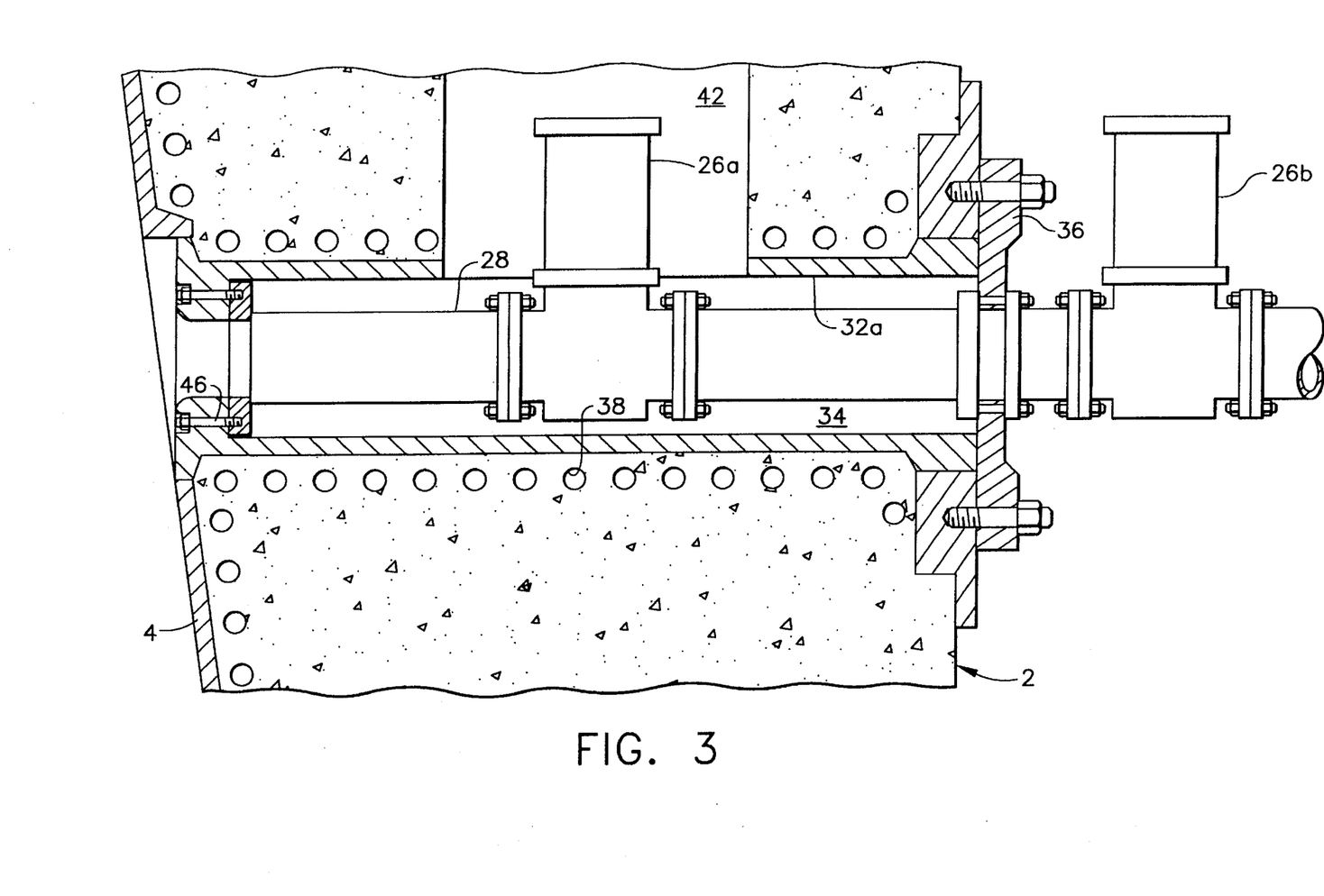
FIG. 3 is a sectional elevation view of a main steam line isolation valve layout in accordance with one preferred embodiment of the invention.

The preferred embodiment shown in FIG. 1 includes a pair of MSIVs 26a and 26b installed in a main steam line 28, and a pair of FWIVs 26c and 26d installed in a feedwater line 30. The main steam line 28 penetrates inner steel liner 4 and the wall of PCRV 4, and is encased by guard piping 32a with an intermediate space 34 therebetween. Intermediate space 34 is closed off at one end by a cover plate 36 bolted to the PCRV wall. Cover plate 36 also supports the main steam line 28 as shown in FIG. 3. The MSIV 26b may be located outside the PCRV. To protect the concrete against high temperatures, cooling water piping 38 can be embedded in the circumferential region surrounding the guard piping 32a.

The in-board MSIV 26a inserted in main steam line 28 is placed in a protective canister in the form of a circular cylindrical vertical valve tunnel 42 closed at the top by a cover plate 44, as shown generally in FIG. 1 and in more detail in FIG. 3. The canister 42 provides leakage control with provision for maintenance access. The valve tunnel cover plate 44 mounted to the top surface of the PCRV maintains the continuity of the primary containment boundary. The continuity of the containment boundary is also maintained at the exit side of the main steam line tunnel by mounting cover plate 36 over the tunnel penetration and allowing the main steam line 28 to pass through the cover. The pressure in the valve tunnel volume is monitored to detect any internal or external leakage. Upon detection of leakage either in the valve access tunnel or in the main steam line penetration tunnel, the reactor will isolate (isolation valves close and isolation condensers operate to maintain reactor pressure and level), and the reactor is shutdown (insertion of control rods) for repair.

The access tunnel cover plate 44 and penetration tunnel cover plate 36 are designed to provide access for maintenance during the normal refueling outage. The steam line 28 can be plugged from inside the vessel, as is current BWR practice during refueling, and bolts 46, which connect the valve assembly to the steel inner liner 4, are removed from inside the PCRV. Upon removal of a steam line segment and the valve tunnel cover plate, the entire valve assembly will slide out of the tunnel.

The internal MSIV 26a in the access tunnel 42 is preferably very compact in design to minimize the structural impact and cost of the PCRV. A fast-closing gate valve with a system steam-actuated piston could be used for this purpose. The MSIVs external to the PCRV are not constrained by the PCRV and if desired, can be a larger type of MSIV.

Figure 5:
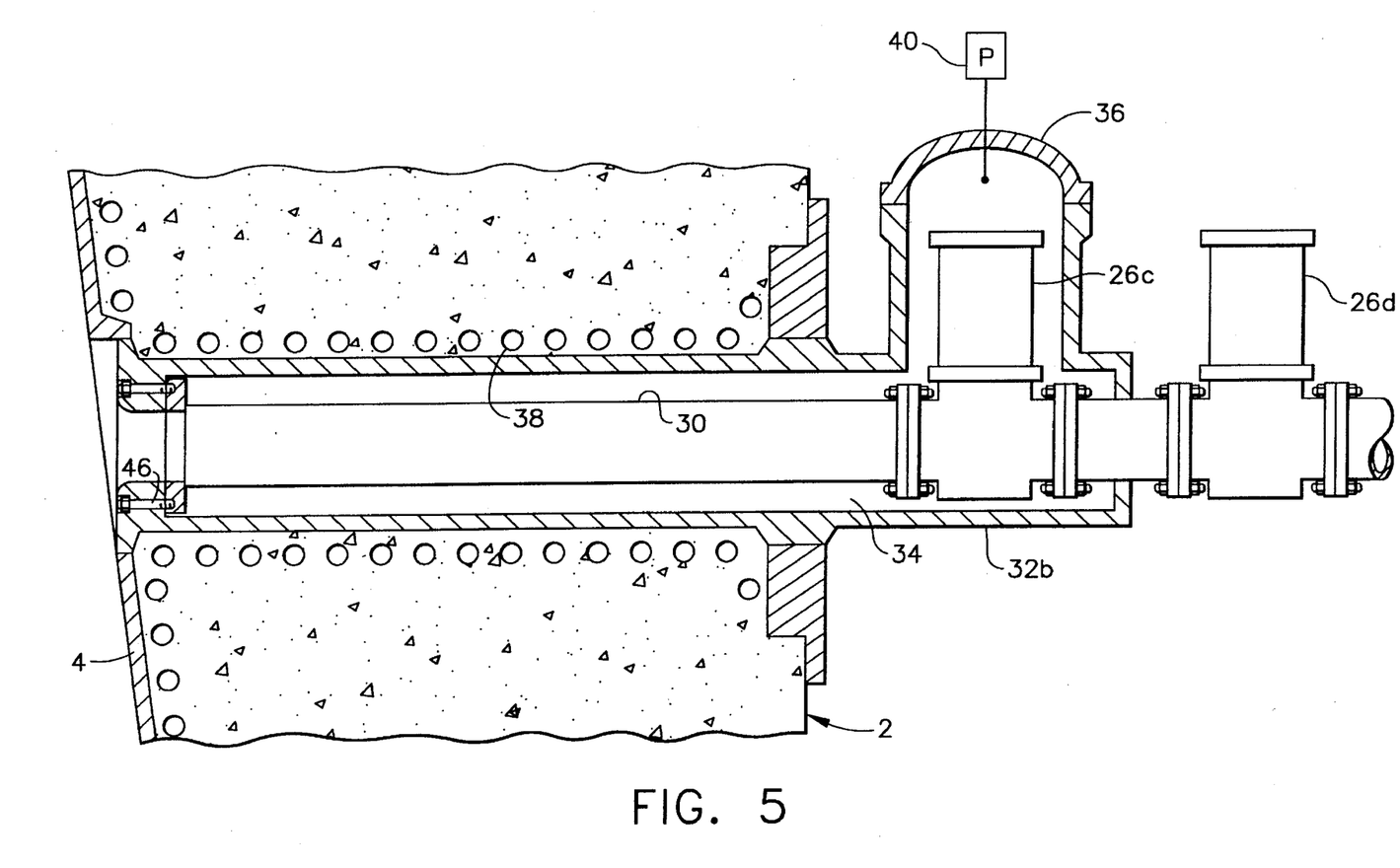
FIG. 5 is a sectional elevation view of a main steam line isolation valve layout in accordance with another preferred embodiment of the invention.

As best seen in FIG. 5, the feedwater line 30 penetrates the wall of PCRV 4. The portion of the feedwater line 30 which penetrates the PCRV wall and the FWIV 26c are encased by guard piping 32b with an intermediate space 34 therebetween. FWIV 26c has its own enclosure head in the guard pipe for maintenance and inspection purposes. Optionally, the guard piping 32b may be extended to encase FWIV 26d. Cooling water piping 38 can be embedded in the circumferential region surrounding the guard piping 32b.

The guard piping is placed around piping through penetrations as a second barrier and defense against primary pressure boundary pipe break. The space between the primary pressure boundary pipe and guard piping is pressurized to an intermediate pressure and monitored by a pressure sensor 40 during plant operation, as shown in FIGS. 3 and 5. If pressure should suddenly increase in this space, it indicates a break in the primary pressure boundary. If pressure should suddenly decrease in this space, it indicates a break in the guard piping. In either case, the reactor will be shutdown in a controlled manner without loss of coolant as a safe action until repairs can be made.

Figure 4:
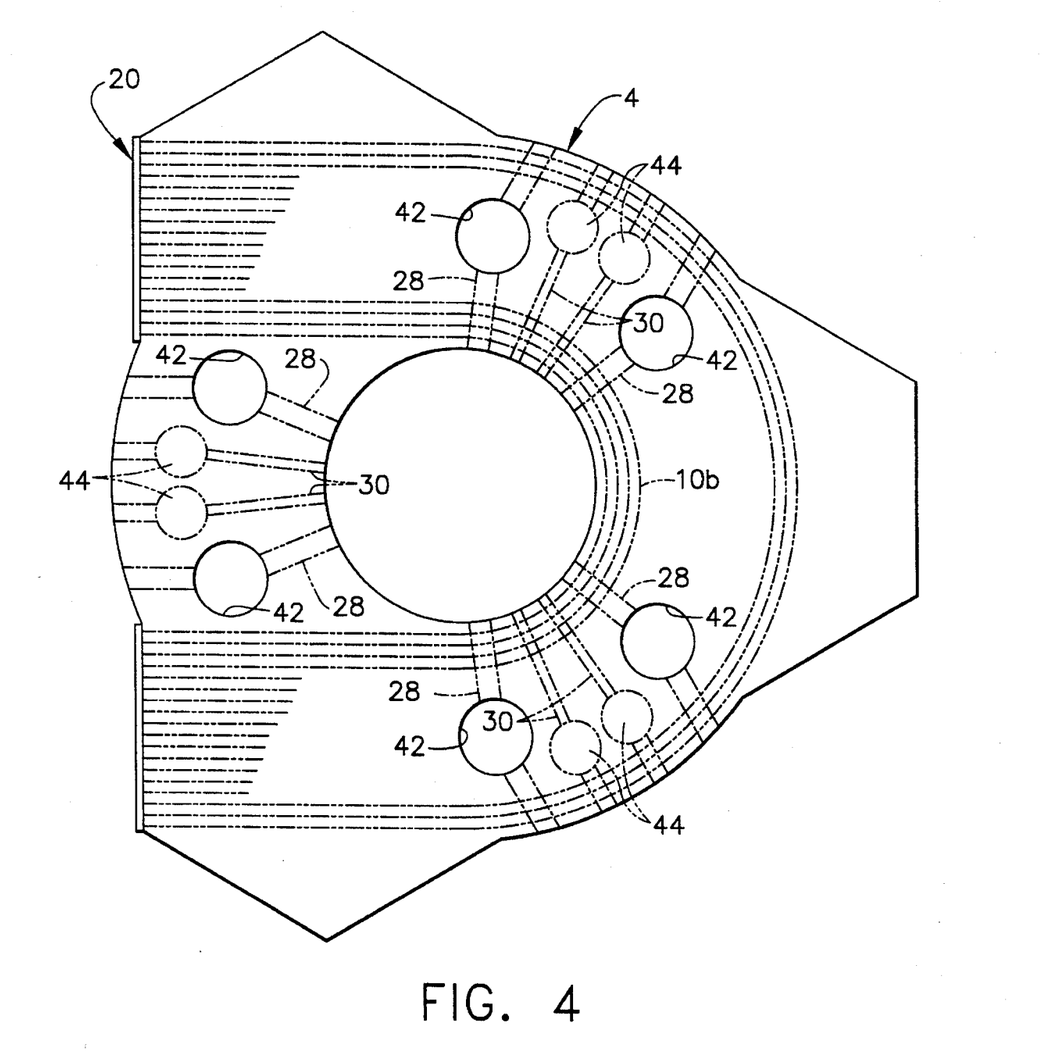
FIG. 4 is a plan view of the layout of cylindrical cavities for containing isolation valves of the type shown in FIG. 3.

Referring to FIG. 4, it can be seen that the reactor of the present invention may have six main steam lines 28 and six feedwater lines 30. Each in-board main steam isolation valve is housed in a respective valve tunnel 42. Each feedwater check valve is housed in a respective valve tunnel 44. Only some of the multiplicity of hoop tendons 10b are shown by dashed lines in FIG. 4.

The design in accordance with the present invention eliminates the possibility of a pipe break causing a LOCA prior to the isolation valves. Reactor penetrations representing large piping are limited to the steam line and feedwater lines at high elevations on the reactor vessel. An isolation valve which is inserted in one of these lines can be located immediately outside the PCRV, inside the PCRV penetration, or inside the containment well.

Figure 6:
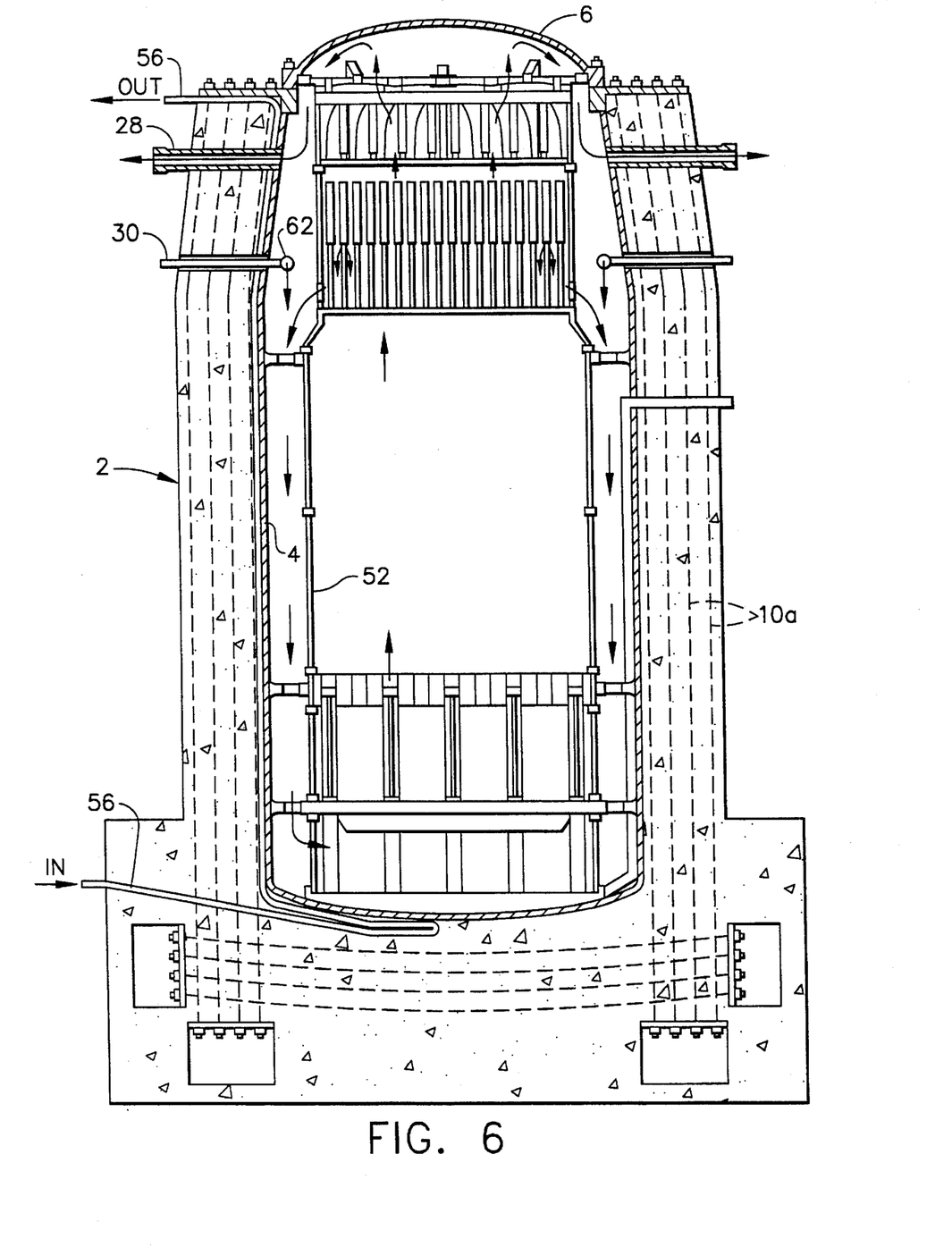
FIG. 6 is a schematic diagram showing a water pipe cooling arrangement which can be incorporated in a reactors built in accordance with the present invention.

To satisfy the concrete temperature limit of 150° F. allowed by the ASME Section III reactor vessel code for normal plant operation, a reactor wall cooling system is required. In accordance with one preferred embodiment, this cooling system consists of a multiplicity of cooling water pipes. An exemplary cooling water pipe 56 is depicted in FIG. 6. A multiplicity of such water pipes can be incorporated in the reactors shown in FIGS. 1 and 2, being embedded in the PCRV 2 adjacent the steel liner 4 at azimuthal intervals.

Figure 7:
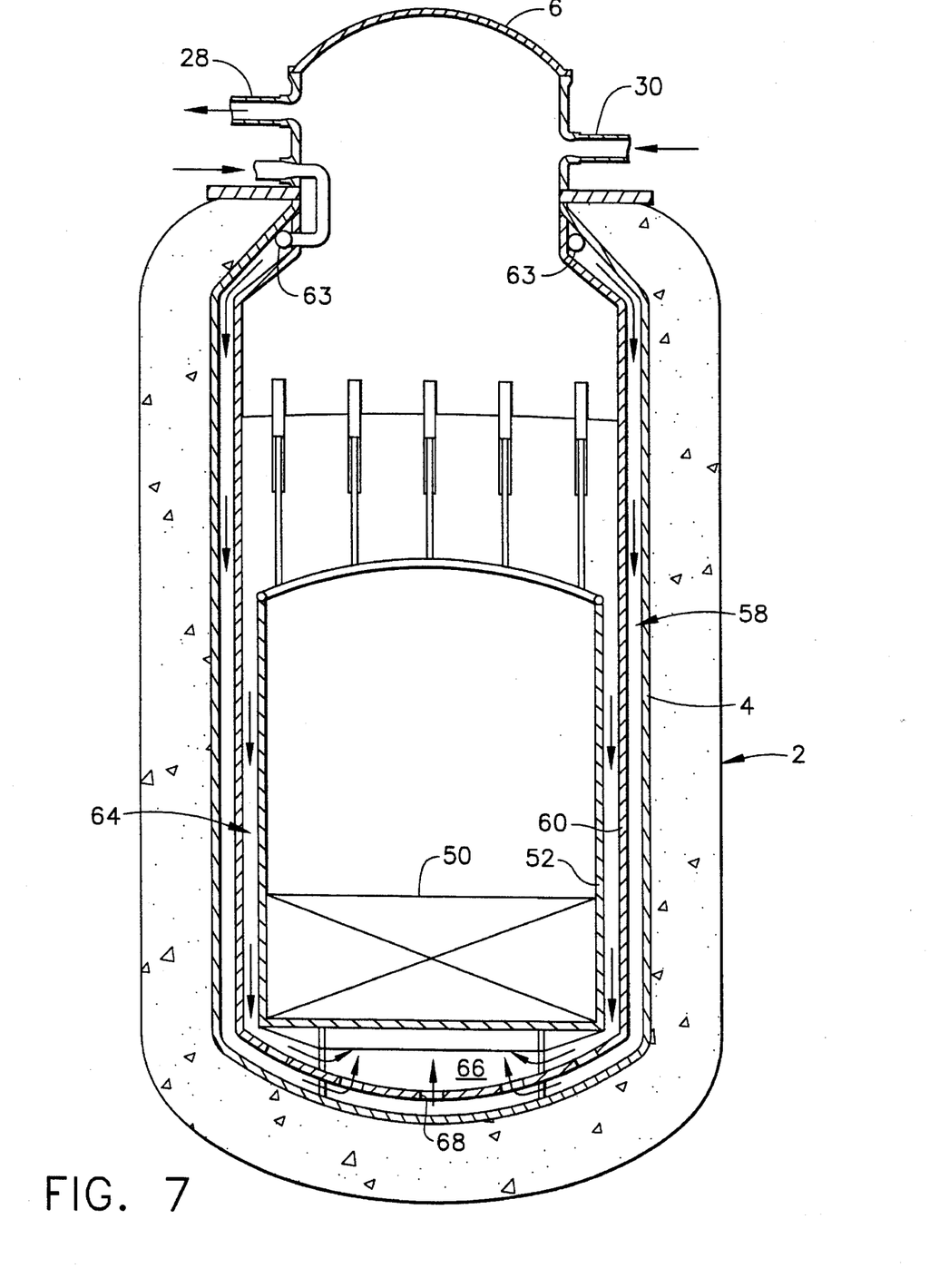
FIG. 7 is a schematic diagram showing a water jacket cooling arrangement which can be incorporated in a reactor built in accordance with the present invention.

In the alternative, a shell 60 having the structure shown in FIG. 7 can be placed inside the PCRV 2 (see FIGS. 1 and 2) such that an annular cooling water flow channel 58 is formed between shell 60 and steel liner 4. The annular flow channel 58 receives cooling water from a cooling water sparger 63. The cooling water flowing downward in annular flow channel 58 from the top towards the vessel lower plenum 66 in a curtain which cools steel liner 4 to protect the concrete of PCRV 2 against excessive temperature. The cooling water in channel 58 enters the vessel lower plenum 66 via a plurality of openings 68 formed in the bottom of jacket 60. The cooling water entering vessel lower plenum 66 mixes with the feedwater flowing downward through the downcomer annulus 64 between core shroud 52 and the shell 60.

Figure 8:
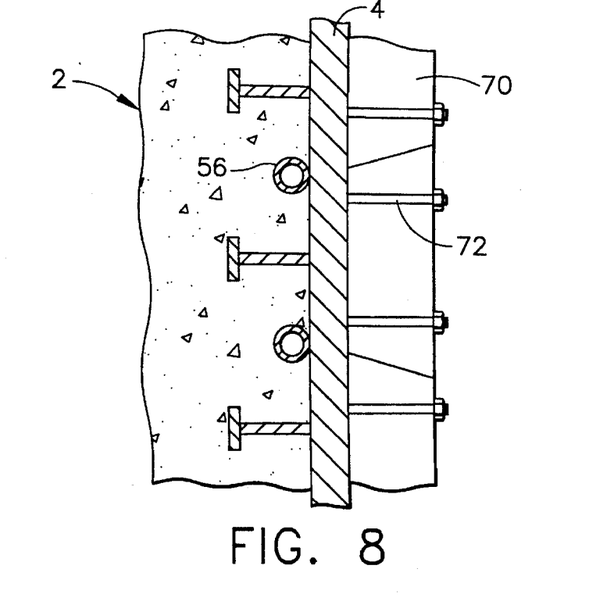
FIG. 8 is a schematic diagram showing a thermal insulation arrangement which can be incorporated in the reactor depicted in FIG. 6.
Figure 9:
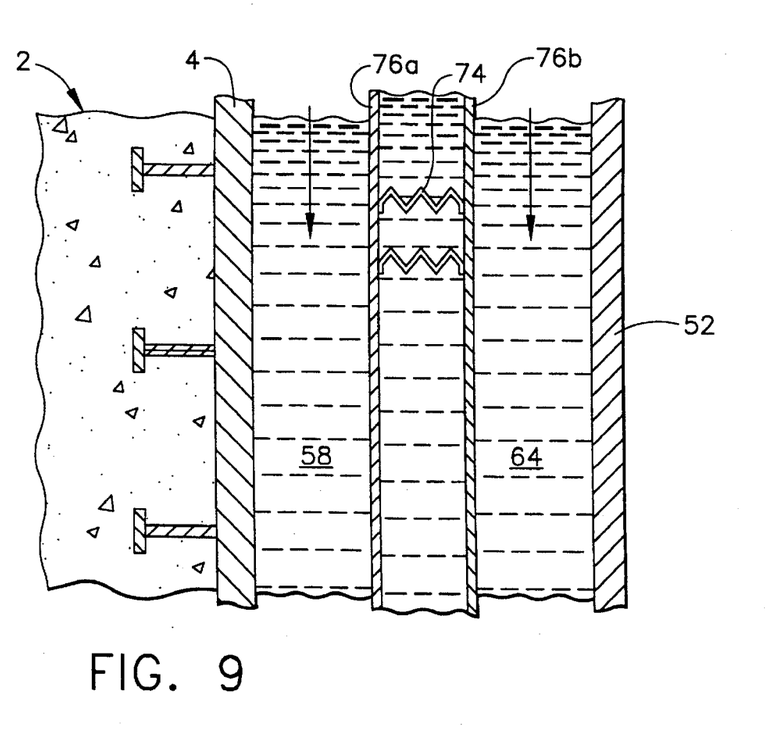
FIG. 9 is a schematic diagram showing a thermal insulation arrangement which can be incorporated in the reactor depicted in FIG. 7.
Figure 10:
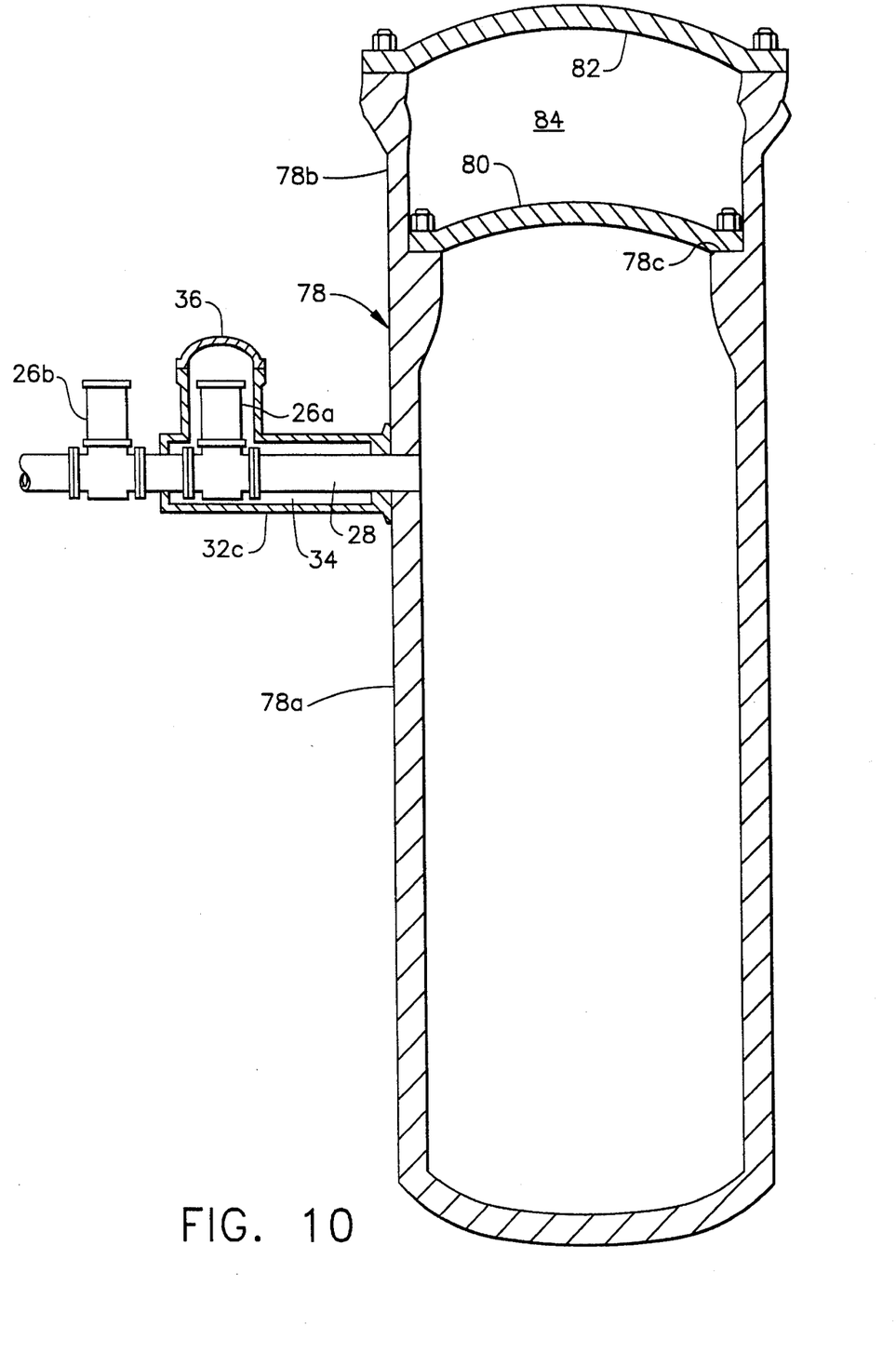
FIG. 10 is a schematic diagram showing a natural circulation reactor having a steel reactor pressure vessel, double steel head closures and a contained main steam line isolation valve in accordance with an alternative preferred embodiment of the invention.

The prestressed concrete reactor vessel wall cooling can also be accomplished by insulating the vessel wall using thermal insulation made of corrugated metal sheets or fused silica. As seen in FIG. 8, the fused silica is cut into blocks 70 of predetermined shape, drilled and mounted directly to the liner wall 4 by means of anchors 72. The fused silica blocks 70 would overlap to provide continuous insulation while including clearances for thermal expansion during heat up. Referring to FIG. 9, the shell designated 60 in FIG. 7 can be constructed as a thermal insulation jacket having corrugated metal sheets 74 connecting inner and outer shells 76a and 76b made of metal plate. The spaces inside this thermal insulation jacket are filled with water. By combining the cooling system with an insulation layer of zirconium sand or fused silica blocks, the demands on the cooling system will be greatly reduced and system redundancy is provided The isolation scheme of the present invention can also be applied to a steel reactor pressure vessel, as shown in FIG. 10. The steel reactor vessel 78 comprises a pressure vessel portion 78a and a containment portion 78b, which extends upward from the top of the pressure vessel portion 2b. The top of the pressure vessel portion 78a is closed by a steel dome 80 which has an annular flange seated on a shoulder 78c formed on the inner periphery at the top of the pressure vessel portion 78a and held down by an arrangement of studs and nuts. Similarly, the top of the containment portion 78b is closed by a steel dome 82 which has an annular flange held down in a manner similar to that described for dome 80. The steel domes 80 and 82 and containment 78b form a well 84 for containing gases which may escape from the pressure vessel in the event that dome 80 is breached. In accordance with the concept of the present invention, the steel dome 80 or the seal of the head is designed to fail before the steel pressure vessel portion 78a fails.

Isolation valves 26a and 26b are provided in the main steam line 28. A similar arrangement of isolation valves can be provided for each penetration piping. The in-board isolation valve is encased in guard piping 32c. A cover 36 allows access to the isolation valve 26a for maintenance purposes. The intermediate space 34 is pressurized and monitored as previously described in connection with FIG. 5. Optionally, the guard piping can be extended to encase the outboard isolation valve 26b as well.

The preferred embodiments of the present invention have been disclosed for the purpose of illustration. Variations and modifications of the disclosed structures which fall within the concept of this invention will be readily apparent to persons skilled in the art of reactor design. Although the preferred embodiments have been disclosed with reference to natural circulation reactors, the concept of the invention is equally applicable to forced circulation reactors. All such variations and modifications are intended to be encompassed by the claims set forth hereinafter.

We claim:

1. A nuclear reactor comprising:

a vessel having an internal volume which is open at the top;

a first vessel closure fastened to said vessel at a first elevation, said first vessel closure closing a lowermost portion of said internal volume to form a first chamber;

a nuclear fuel core arranged inside said first chamber; and a second vessel closure fastened to said vessel at a second elevation higher than said first elevation, said second vessel closure closing an uppermost portion of said internal volume to form a second chamber between said first vessel closure and said second vessel closure, wherein said first vessel closure is designed to leak at a predetermined pressure inside said first chamber while said vessel will not leak at said predetermined pressure inside said first chamber.

2. The nuclear reactor as defined in claim 1, wherein said vessel is made of steel.

3. The nuclear reactor as defined in claim 1, wherein said vessel comprises a prestressed concrete vessel lined with a steel liner inside said first chamber.

4. The nuclear reactor as defined in claim 1, wherein said first vessel closure comprises a first steel dome.

5. The nuclear reactor as defined in claim 4, wherein said second vessel closure comprises a second steel dome.

6. The nuclear reactor as defined in claim 3, wherein said first vessel closure comprises a steel dome and an annular flange, said steel dome having an outer periphery connected to an inner periphery of said annular flange, and said prestressed concrete vessel comprises a tendon which is anchored at first and second ends by first and second tensioned nuts respectively, said first tensioned nut bearing against said annular flange for exerting a force which secures said steel dome to said prestressed concrete vessel.

7. The nuclear reactor as defined in claim 1, further comprising a pipeline which penetrates said vessel, an isolation valve located outside said vessel and arranged to selectively block fluid flow through said pipeline when operated in an isolation mode, and an encasement which surrounds said isolation valve and said pipeline to form a sealed volume for retaining any leakage from said pipeline and said isolation valve.

8. The nuclear reactor as defined in claim 7, wherein said sealed volume is pressurized to a pressure less than a pressure inside said pipeline and greater than a pressure outside said encasement, further comprising means for monitoring the pressure level inside said sealed volume.

9. A nuclear reactor comprising:

a prestressed concrete vessel having an internal volume which is open at the top;

a first vessel closure fastened to said vessel at a first elevation, said first vessel closure closing a lowermost portion of said internal volume to form a first chamber;

a nuclear fuel core arranged inside said first chamber; and a second vessel closure fastened to said vessel at a second elevation higher than said first elevation, said second vessel closure closing an uppermost portion of said internal volume to form a second chamber between said first vessel closure and said second vessel closure, wherein a portion of said vessel inside said first chamber is lined with a steel liner on its inner surface.

10. The nuclear reactor as defined in claim 9, wherein said first vessel closure comprises a steel dome and an annular flange, said steel dome having an outer periphery connected to an inner periphery of said annular flange, and said prestressed concrete vessel comprises a tendon which is anchored at first and second ends by first and second tensioned nuts respectively, said first tensioned nut bearing against said annular flange for exerting a force which secures said steel dome to said prestressed concrete vessel.

11. The nuclear reactor as defined in claim 9, further comprising:

a vertical access tunnel formed in the concrete of said vessel and having a bottom end and a top end;

guard piping which penetrates said vessel and has a side opening which communicates with said bottom end of said vertical access tunnel;

a first pipeline mounted inside said guard piping with a space therebetween, said first pipeline having first and second ends, said first end being in fluid communication with said first chamber and said space being in fluid communication with said vertical access tunnel;

a second pipeline located outside said vessel and in fluid communication with said second end of said first pipeline;

an isolation valve located in said vertical access tunnel and arranged to selectively block fluid flow through said first pipeline when operated in an isolation mode; and means for sealing the volume formed by said space and said vertical access tunnel.

12. The nuclear reactor as defined in claim 11, wherein said sealed volume is pressurized to a pressure less than a pressure inside said first pipeline and greater than a pressure outside said second pipeline further comprising means for monitoring the pressure level inside said sealed volume.

13. The nuclear reactor as defined in claim 9, further comprising a cooling water flow channel arranged in such proximity to said steel liner that heat is transferred from said steel liner to cooling water flowing in said flow channel.

14. The nuclear reactor as defined in claim 9, further comprising thermal insulation placed between said steel liner and said fuel core.

15. The nuclear reactor as defined in claim 14, wherein said thermal insulation comprises fused silica blocks attached to said steel liner.

16. The nuclear reactor as defined in claim 14, wherein said thermal insulation comprises an annular housing containing corrugated metal sheets, said annular housing being spaced from said steel liner to form an annular flow channel therebetween.

* * * * *